United States Patent [19]
Tokumasu et al.

[11] Patent Number: 5,621,872
[45] Date of Patent: Apr. 15, 1997

[54] CURVED SURFACE GENERATING METHOD AND APPARATUS THEREFOR

[75] Inventors: Shinji Tokumasu; Shiro Nonaka; Yasumasa Kawashima; Takayuki Ishikawa; Norihiro Nakajima, all of Hitachi, Japan

[73] Assignee: Hitachi, Ltd., Tokyo, Japan

[21] Appl. No.: 848,135

[22] Filed: Mar. 9, 1992

[30] Foreign Application Priority Data

Mar. 8, 1991 [JP] Japan ................................. 3-043247

[51] Int. Cl.⁶ ........................................ G06F 15/00
[52] U.S. Cl. ........................................................ 395/142
[58] Field of Search .................................... 395/142, 162, 395/141, 163, 164; 340/798, 799; 345/16, 17, 118

[56] References Cited

U.S. PATENT DOCUMENTS

| | | | |
|---|---|---|---|
| 4,999,789 | 3/1991 | Fiasconaro | 364/518 |
| 5,179,645 | 1/1993 | Tanimori | 395/141 |
| 5,185,855 | 2/1993 | Kato et al. | 395/129 |
| 5,241,472 | 8/1993 | Gur et al. | 364/413.22 |
| 5,241,654 | 8/1993 | Kai et al. | 395/142 |

FOREIGN PATENT DOCUMENTS

61-265675 of 1984 Japan .
63-159982 of 1985 Japan .

OTHER PUBLICATIONS

HCT matching triangular element method described in the reading by Kyuichiro.

Washitsu et al., "Finite Element Method Handbook Basic Compilation", BaifuRan, pp. 256–263, 1991.

A Survey of curve and surface methods in CAGD by Gerald Farin et al., Elsevier Science Publishers, B.V., pp. 1–60, 1984.

Method for fairing B-spline surfaces, by N. J. Lott et al. vol. 20 No. 10 Dec. 1988 Butterworth & Co. Ltd., pp. 597–604.

Fast Surface Interpolation Using Hierarchical Basis Functions, by Richard Szeliski, vol. 12 No. 6, Jun. 1990, IEEE, pp. 513–528.

Primary Examiner—Phu K. Nguyen
Attorney, Agent, or Firm—Antonelli, Terry, Stout & Kraus, LLP

[57] ABSTRACT

A curved surface generated on a closed curve is expressed by an equation of a film having a physical property. The film is considered as a virtual elastic film generated on the closed curve. A curved surface is generated on the closed curve through changing the shape of the elastic film by operator's setting of both the mechanical force of the elastic film and the normal direction of the elastic film on the closed curve.

30 Claims, 5 Drawing Sheets

CURVED SURFACE GENERATING METHOD AND APPARATUS THEREFOR

BACKGROUND OF THE INVENTION

The present invention relates to a method for generating a curved surface by a curved surface generator such as CAD, CAM, etc., and particularly relates to a curved surface generating method and an apparatus therefor, which are suitable for generating a curved surface designed by an operator, through a simple procedure.

CAD/CAM systems have been popularized so that designed furnishings, cars, industrial arts and the like have been drawn by a computer. In the case where a designer uses such a conventional system to express an image of a certain shape, first a shape approximating to the target shape is drawn by shape feature line groups and then these line groups are decomposed or auxiliary lines are added thereto so that the image is expressed as tetragonal nets generated in three-dimensional space. For example, such nets are expressed by line groups constituting sides of tetragons and are called "wire frame". Then, a curved surface called "tetragonal patch" is generated correspondingly to each of the tetragons constituting the wire frame. Further, adjacent tetragonal patches are connected to one another so smoothly as to form a curved surface on the whole of the wire frame. In the case where each tetragonal patch is generated, a point on the patch is expressed by a vector function on the basis of the rule of smoothly changing opposite sides of a tetragon from one to the other. As the vector function, used is a Bezier or B-spline three-order equation having two parameters because the calculation thereof is easy.

In the case where adjacent tetragonal patches are connected to one another so smoothly as to form a curved surface, a considerably complex process is required. Further, it is difficult that a formative structure having an end portion greatly distorted in shape is sufficiently expressed by the tetragonal wire frame (three-dimensional graph). Therefore, as described in Japanese Patent Unexamined Publication JP-A-63-159982, a wire frame is generated so as to contain trigonal patches as well as tetragonal patches to thereby smoothly generate a curved surface in the trigonal and tetragonal patches contained in the wire frame. Further, as described in Japanese Patent Unexamined Publication JP-A-61-265675, curved surface patches being constantly lifted or dented to locally modify the wire frame are generated again in the case where a curved surface once generated is out of the target shape.

SUMMARY OF THE INVENTION

In the case where a curved surface of an arbitrary shape is generated by the conventional CAD/CAM system, a complex process is required for operating patch dividing means, patch connecting means and the like because the curved surface is expressed as a set of trigonal and tetragonal patches. That is, in order to express the curved surface of the wire frame by trigonal and tetragonal patches, skilled computer engineer's work independent of designer's work is indispensable to the obtaining of a curved surface to be found. For example, the design of a body of an airplane or a body of a car greatly depends on computer engineer's techniques. That is, not only the conventional curved surface generator is difficult to handle to the designer as a green hand at the computer techniques but a large time is required for computer engineer's operation. There arises a problem in that designer's original work may be often stopped. This is a factor by which the curved surface generator is not sufficiently popularized but is used as a computer engineer's private apparatus.

An object of the present invention is to provide a curved surface generating method and an apparatus therefore, in which it is possible to save the curved surface generating process so that an ordinary operator can generate an arbitrary three-dimensional curved surface easily and speedily.

According to a first aspect of the invention, when a curved surface of an arbitrary shape is to be generated in the form of a closed curve to thereby exhibit the curved surface on a display, first the boundary of an arbitrary shape of the curved surface to be generated is generated, then a projection line is generated onto a plane as a reference closed curve in one-to-one correspondence with the boundary, then a curved surface generated over the boundary of the arbitrary shape by using the reference closed curve is expressed by an equation of a predetermined physical property, and then the boundary condition for the equation is designated to change the shape of the surface generated over the reference closed curve to thereby generate, as the target curved surface, a projection surface which is obtained by projecting the reference closed curve onto the boundary of the arbitrary shape of the curved surface.

According to a second aspect of the invention, when a curved surface is to be generated on a closed curve of an arbitrary and exhibited on a display, first the boundary of a curved surface of an arbitrary shape to be generated is generated, then a projection line is generated on a plane as a reference closed curve in one-to-one correspondence with the boundary, then the region enclosed in the reference closed curve is divided into polygons not overlapping one on another, then curved surfaces on the polygons are expressed by equations of a predetermined physical property, and then the boundary condition is set into the respective equations to change the shape of the curved surface generated on each of the polygons, and a found curved surface is generated as a projection surface which is obtained when the reference closed curve is projected onto the boundary of the curved surface of the arbitrary shape.

The curved surface generated over the reference closed curve is expressed by an equation of an elastic physical property.

When the curved surface generated over the reference closed curve is expressed by an equation of an elastic film having an elastic physical property to generate the curved surface on the closed curve of the arbitrary shape, the whole shape of the curved surface generated on the closed curve of the arbitrary shape is determined at once. The curved surface can be relatively easily generated on the closed curve of the arbitrary shape, compared with the conventional method in which the curved surface is generated by connecting small patches to one another. The shape of the curved surface generated on the arbitrary closed curve on a three-dimensional space is changed so as to adjust the reference closed curve on the plane to the boundary of the curved surface of the arbitrary shape on the three-dimensional space. When the curved surface is changed correspondingly to the change of the reference closed curve, the curved surface can be easily and speedily generated on the closed curve of the arbitrary shape.

DESCRIPTION OF THE PREFERRED EMBODIMENTS

Preferred embodiments of the present invention will be described hereunder with reference to the drawings.

Figure 2:
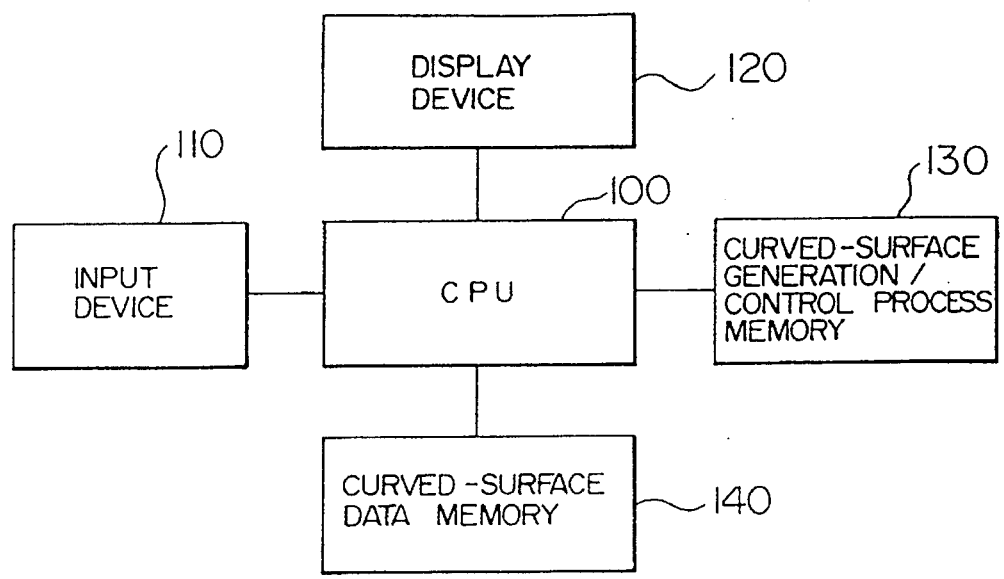
FIG. 2 is a block diagram of a curved surface generating apparatus as an embodiment of the invention.

Referring now to FIG. 2, there is shown a curved surface generating apparatus as an embodiment of the invention. In the curved surface generating apparatus in this embodiment, when an operator operates an input device 110 to read a program of a curved surface generating control procedure stored in a memory 130 onto a central processing unit 100 and then execute the program, a figure of a wire frame, an intermediate figure and a resulting figure of a surface curve are exhibited on a display device 120 correspondingly to the stages of the operator's input operation. Data for these figures are stored in a curved surface data memory 140 so that the data are used by the following processes.

Figure 1:
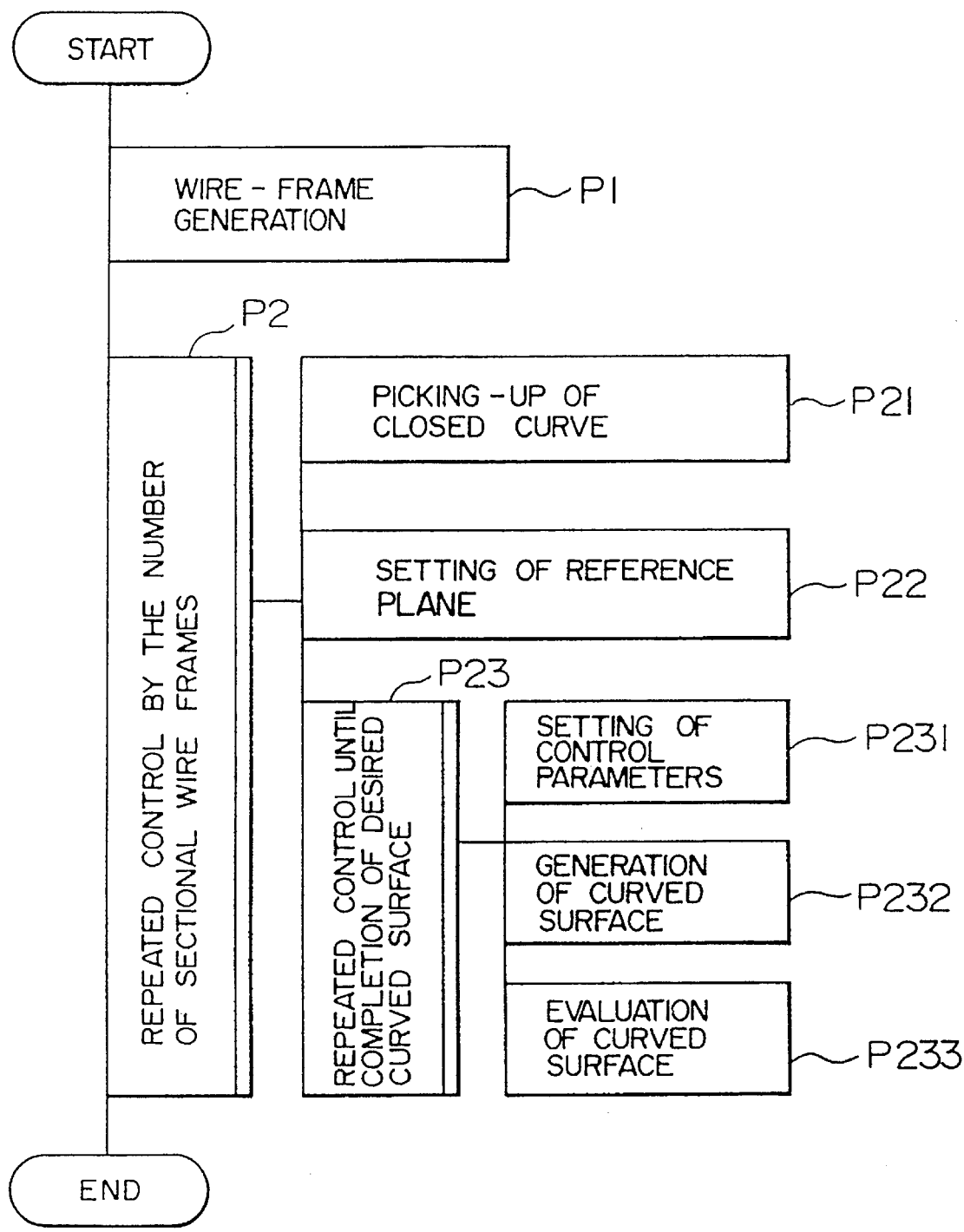
FIG. 1 is a flow chart showing the processes of a curved surface generating method as an embodiment of the invention.

FIG. 1 is a constituent diagram of a computer program concerned with the processes of the above-mentioned curved surface generating method. For, example, first in a process P1, a wire frame, that is, a closed curve, is generated to express a part of a car body. This generating method is the same as the conventional method in which the closed curve is generated as a three-dimensional closed curve of the car body. In a process P2, execution of a series of processes P21 to P23 (which will be described later) is repeated by the number of sectional boundary surfaces as a part of the wire frame expressing the whole of the car body. The sectional boundary surfaces are individual curved surfaces obtained by decomposing the whole curved surface expressed by the wire frame into relatively simple frames. When, for example, the whole curved surface of a car body is generated, the whole shape is generated as a set of a bonnet portion, a wind shield portion, a tire portion, a trunk portion and the like. The respective portions make such sectional boundary surfaces. Each of the sectional boundary surfaces is used as a curved surface generating unit which will be described hereunder. A closed curve containing each of the sectional boundary surfaces is called "sectional wire frame". In a process P21, one sectional wire frame as described above is picked up. In a process P22, a reference plane which will be described later is set. In a process P23, a series of processes P231 to P233 is repeated. A desired curved surface is generated by the repetition of the series of processes P231 to P233. The setting of a reference plane in the process P22, the setting of control parameters in the process P231 and the generation of a curved surface in the process P232 will be described hereunder more in detail. The evaluation of the curved surface in the process P233 is based on the designer's seeing of the curved surface generated and exhibited on the display device 120.

Figure 3:
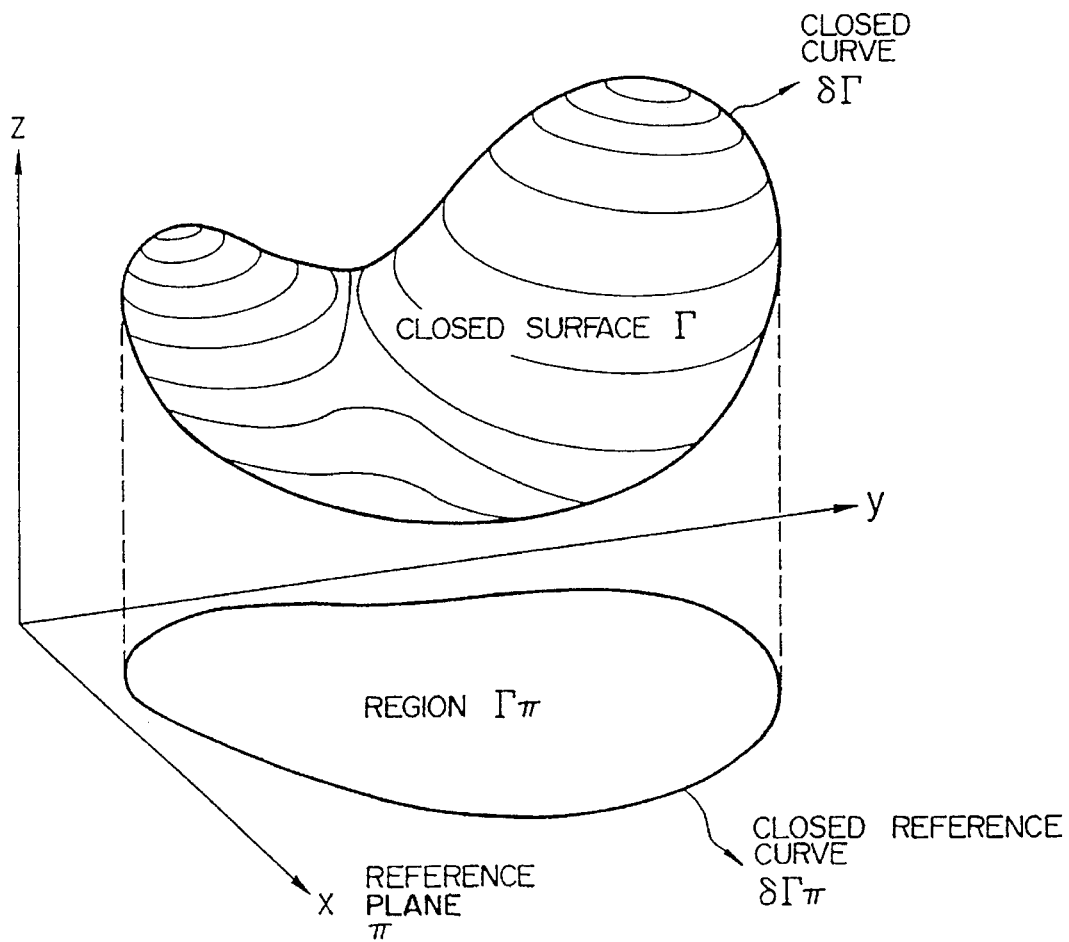
FIG. 3 is a graph for explaining the relations between a closed curve, a reference plane and the region thereof.

FIG. 3 is a graph for explaining the setting of a reference plane in the process P22. Let $\partial\Gamma$ be the closed curve (the sectional wire frame picked up as a part of the wire frame of the car body in the process P21) exhibited in three-dimensional space. One plane $\pi$ for the closed curve $\partial\Gamma$ is now considered, so that an image obtained by parallel projection of the closed curve $\partial\Gamma$ onto the plane $\pi$ along the direction of normal line onto the plane $\pi$ is expressed by a closed curve $\partial\Gamma\pi$. The plane $\pi$ is set so that the closed curve $\partial\Gamma$ has one-to-one correspondence with the closed curve $\Gamma\pi$ (the meaning is that points on the two closed curves have one-to-one correspondence) and so that the area of a two-dimensional region $\Gamma\pi$ enclosed in the closed curve $\partial\Gamma\pi$ is maximized (or made as large as possible). The plane $\pi$ is used as a reference plane. The reference plane is represented by $\pi$ similarly to the afore-mentioned plane. This is a reference plane setting method in the process P22. The closed curve $\partial\Gamma\pi$ obtained on the reference plane $\pi$ is now called "reference closed curve". The two-dimensional region $\Gamma\pi$ is merely called "region".

Then, with respect to a curved surface to find a projection surface as having one-to-one correspondence with the region $\Gamma\pi$, the rule of generating such a projection surface is set. When the curved surface generating conditions are R11 and R12, the rule is set as follows.

[Condition R11]

When a curved surface having a closed curve $\partial\Gamma$ as the boundary is represented by $\Gamma$, the curved surface $\Gamma$ is projected onto the region $\Gamma\pi$ in one-to-one correspondence. When the two axes $\underline{x}$ and $\underline{y}$ in a rectangular coordinate system are placed on the reference plane $\pi$ and the normal line on the reference plane $\pi$ is used as the $\underline{z}$ axis, the curved surface $\Gamma$ of a desired shape to be found can be univocally represented by the following equation.

$$z = Z(x, y) \quad (x, y) \in \Gamma\pi \tag{1}$$

[Condition R12]

The curved surface $\Gamma$ is a result of the change of the region $\Gamma\pi$ obtained by changing the reference closed curve $\partial\Gamma\pi$ so as to coincide with the closed curve $\partial\Gamma$. Here, the region $\Gamma\pi$ is dealt with as a surface obeying the physical rule, for example, as an elastic film. When the region $\Gamma\pi$ is considered as an elastic film, the shape of the curved surface $\Gamma$ obeys the relation of the following equation (2).

$$\Delta^2 z \equiv \frac{\partial^4 z}{\partial x^4} + 2 \cdot \frac{\partial^4 z}{\partial x^2 \partial y^2} + \frac{\partial^4 z}{\partial y^4} \tag{2}$$
$$= h'(x,y) \text{ on } \Gamma\pi$$

Because this equation is an equation of an elastic film, a condition expressed by the following equations (3) and (4) is given as the boundary condition for solving the equation (2).

$$z = z' \text{ (of } \partial\Gamma) \text{ on } \partial\Gamma\pi \tag{3}$$

$$\partial z/\partial n = \partial z'/\partial n \text{ on } \partial\Gamma\pi \tag{4}$$

In these equations, "'" is a symbol expressing a "given" value. That is, input data h'(x,y) in the equation (2) as the boundary condition shows a loading condition for determining the shape of the curved surface, or in other words, h'(x,y) shows a virtual mechanical force. The value of this force is set by the operator. The value may be inputted through a keyboard or may be designated through a mouse. While the curved surface is fixed to $\partial\Gamma$ and then the tangential plane of the curved surface on ∂Γ is defined as the boundary condition, the gradient of the film in the outward normal line on ∂Γπ is given by the equation (4). The change of the gradient is designated by color gradation or by arrows.

As described above, when the operator sets both the gradient at the boundary of the sectional wire frame and the mechanical force of the film, the shape of the curved surface generated in the sectional wire frame is calculated on the basis of the equation (2) and exhibited on the display device 120. In the case where the exhibited shape of the curved surface is to be changed, the changed curved surface is calculated in the same manner as described above simply by changing the set values of the mechanical force and the gradient and then exhibited. As described above, in this embodiment, the curved surface is automatically generated by a computer according to the equation of an elastic film on the assumption that the curved surface is considered as an elastic film having physical properties. Accordingly, processes such as a process of connecting trigonal or tetragonal patches are not required, so that the shape of a desired curved surface can be obtained speedily.

Figure 7:
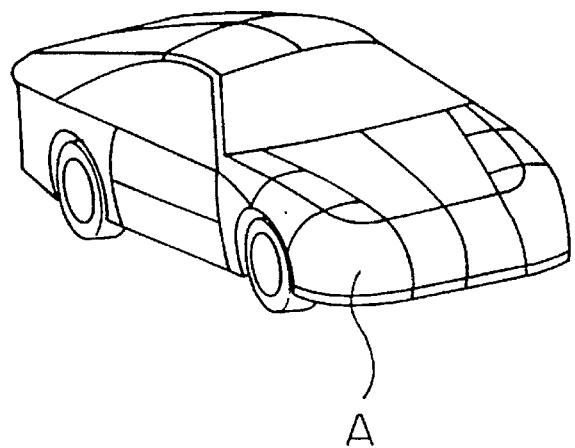
FIG. 7 is a view showing a sectional curved surface A of a car body.
Figure 8:
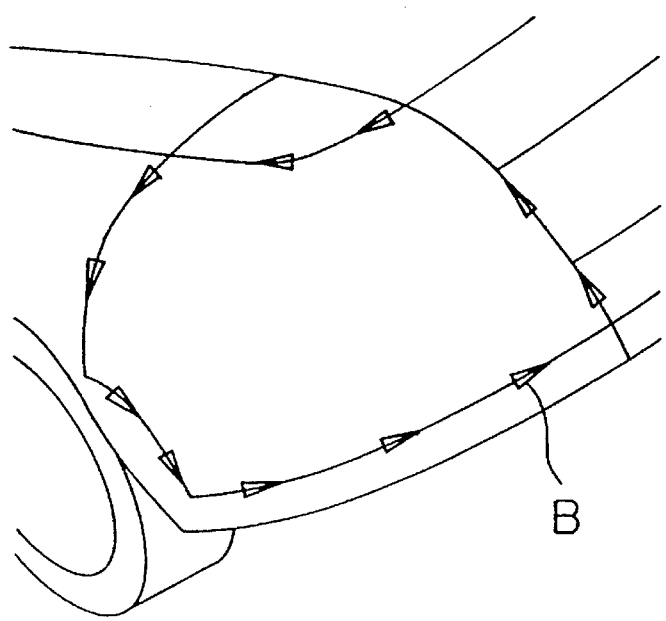
FIG. 8 is an enlarged view of the sectional wire frame B in which the boundary thereof is shown by the arrows B.

As described above, FIG. 3 is a graph for explaining the process of generating the curved surface Γ by the curved surface generating method according to the present invention. An example of the curved surface generated by the curved surface generating method according to the invention is shown in FIG. 7. When the sectional curved surface A shown in FIG. 7 is generated by the conventional method, the curved surface Γ is formed by trigonal or tetragonal patches, that is, the curved surface Γ is expressed by a large number of patches. On the contrary, according to the invention, the curved surface Γ of the sectional wire flame A can be generated by the boundary, mechanical force, and given a gradient on the boundary. The boundary is given by a mouse or an electronic pen as shown by the arrows B in FIG. 8. The change of the curved surface Γ can be achieved simply by modifying the mechanical force or gradient.

Although this embodiment has shown the case where the physical properties of an elastic film is considered as those of the curved surface, it is a matter of course that the invention is not limited thereto and that the equation (2) of the curved surface is modified to the following equation (2a).

$$(\partial^4 z/\partial x^2 \partial y^2) = h'(x,y) \text{ on } \Gamma\pi \quad (2a)$$

A virtual region Γπ generated over the reference closed curve Γπ is obtained by solving the equation (2a) with the equations (3) and (4) as the boundary condition. This is equivalent to the fact that a Coons curved surface having a tetragon as the boundary as conventionally used in curved surface design is extended to a curved surface generated over a general reference closed curve.

Otherwise, a soap film may be used. When the soap film is used, the curved surface Γ is obtained so as to minimize the surface area thereof. The following equation (2b) is a general minimum curved surface equation based on an area function A(z).

$$\text{Min } A(z)$$
$$z$$

$$A(z) \equiv \int \Gamma\pi \sqrt{1 + (\partial z/\partial x)^2 + (\partial z/\partial y)^2} \, dxdy \quad (2b)$$

When the equation (2b) instead of the equation (2) is solved with the equation (3) as the boundary condition (in this case, the equation (4) is disused), a curved surface Γ having the properties of the soap film. When the film surface or curved surface in the equation (2b) closely resembles a plane, that is, when the following condition is valid, the equation (2b) is rearranged to the following harmonic equation (2c).

$$|\partial z/\partial x| \ll 1, \, |\partial z/\partial y| \ll 1$$

the equation (2b) is rearranged to the following harmonic equation (2c).

$$\nabla Z \equiv (\partial^2 z/\partial x^2) + (\partial^2 z/\partial y^2) = 0 \text{ on } \Gamma\pi \quad (2c)$$

Accordingly, with respect to the equation of a soap film, the equation (2b) can be initially used as an approximate equation. When another interpretation is given to the equation (2c), that is, when Z is considered as potential, the equation (2c) is an equation expressing a potential distribution in an electrostatic field. Accordingly, the curved surface Γ obtained by solving the equation (2c) can be expressed as a virtual film surface or curved surface in imitation of the potential distribution.

Further, the curved surface can be expressed virtually by an electromagnetic equation or fluid equation instead of the elastic equation.

As to the method for solving the equation (2), the invention is not limited to the specific embodiment. For example, any one of a solution using a differential equation, a method using function analysis, a method using numerical analysis and the like may be used. In this case, the equation (2) can be solved with the 0 variation as follows.

$$\delta\Pi(z) = 0 \quad (5)$$

In this case, the equation (2) is given as follows.

$$\Pi(z) = \int \int \Gamma\pi \left\{ \left( \frac{\partial^2 z}{\partial x^2} \right)^2 + 2\left( \frac{\partial^2 z}{\partial x \partial y} \right)^2 + \left( \frac{\partial^2 z}{\partial y^2} \right)^2 - h \right\} dxdy \quad (6)$$

$$z = z'$$
$$\partial z/\partial n = \partial z'/\partial n \text{ on } \partial\Gamma\pi$$

Π(z) represents internal energy such as strain and potential energy. δΠ(z)=0 means that the elastic film is formed on the curved surface so as to minimize the internal energy.

Figure 4:
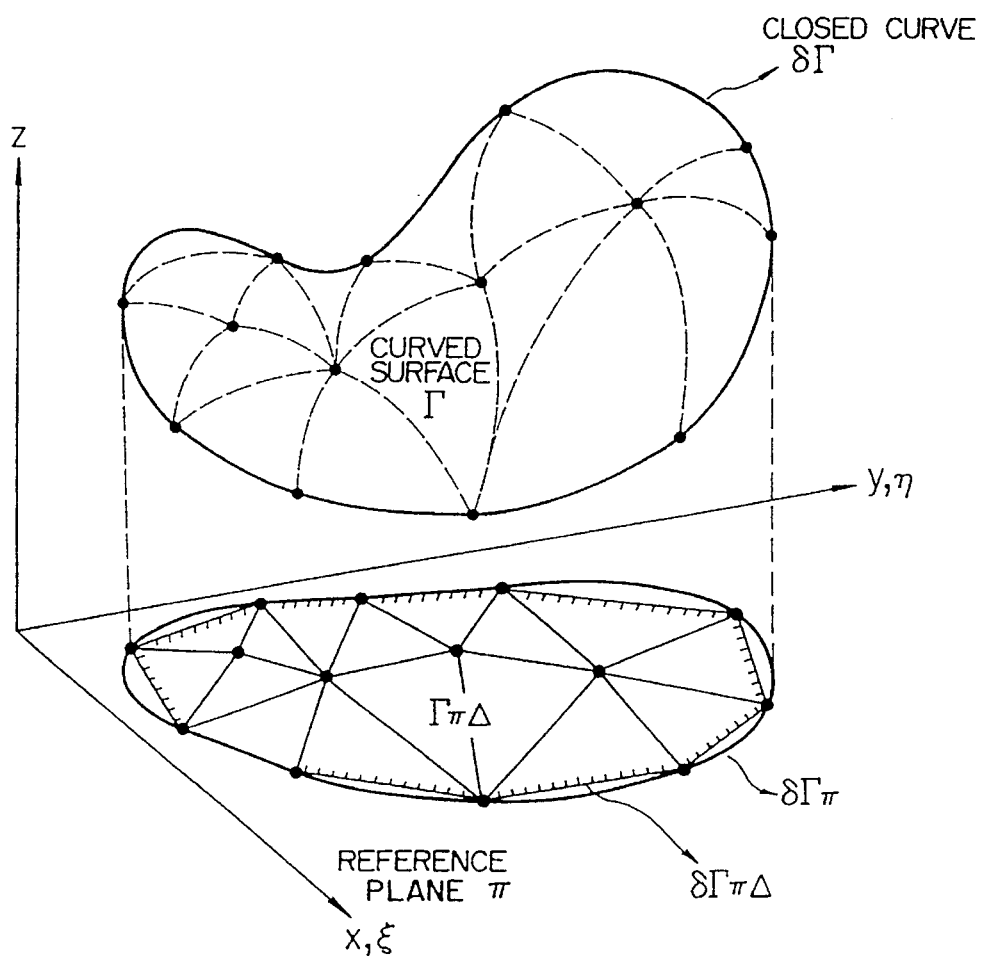
FIG. 4 is a graph for explaining the division of the region into trigonal elements.

Another embodiment of generation of a curved surface will be described hereunder with reference to FIGS. 4 and 5. In this embodiment, first a reference plane π for a closed curve ∂Γ placed in three-dimensional placed in three-dimensional space, a projection image (reference closed curve) ∂Γπ of the closed curve ∂Γ and a region Γπ are obtained in the same manner as in the case of FIG. 3. Then, as shown in the drawing, an Euclidean simplex complex ΓπΔ is formed by dividing the region Γπ into trigons as basic elements. When the boundary of the complex simplex ΓπΔ is represented by ∂ΓπΔ, the nodal point of the trigonal element on the boundary ∂ΓπΔ of the complex is considered to be placed on the reference closed curve ∂Γπ and, at the same time, the boundary ∂ΓΔπ" of the complex is considered to complex is considered to sufficiently approximate the reference closed curve ∂Γπ. Here, to discriminate the coordinates on the complex ΓπΔ from the coordinates (x,y) on the region Γπ, the x and axes are copied to ξ and η axes on the reference plane π so that a point on the complex ΓπΔ can be expressed as the coordinates (ξ,η).

Processes R1, R2, R3 and R4 for generating a curved surface of the complex ΓπΔ are set as follows.
[Process R1]

When the curved surface Γ is expressed by a vector function S(ξ,η) concerned with a point (ξ,η), the following equation (7) is obtained.

$$S(\xi,\eta) \equiv S(x,y,z) = X(x(\xi,\eta), y(\xi,\eta), z(\xi,\eta)) \quad (7)$$

That is, a point on the curved surface $\Gamma$ is expressed as a displacement of the point on the complex $\Gamma\pi\Delta$.

[Process R2]

The respective displacements in the x, y and z directions are mutually independent because (x,y,z) are not closely connected for the point $(\xi,\eta)$.

[Process R3]

The components $x(\xi,\eta)$ and $y(\xi,\eta)$ are harmonic functions, so that the change $(\xi,\eta) \rightarrow (x,y)$ brings the transformation of the complex $\Gamma\pi\Delta \rightarrow$ the region $\Gamma\pi$. This relation obeys the following equations (8) and (9) with respect to x and y.

$$\nabla^2 x \equiv \frac{\partial^2 x}{\partial \xi^2} + \frac{\partial^2 x}{\partial \eta^2} = 0 \text{ on } \Gamma\pi\Delta \quad (8)$$

where $x = x'$ (of $\partial\Gamma$ on $\partial\Gamma\Delta\pi$)

$$\nabla^2 y \equiv \frac{\partial^2 y}{\partial \xi^2} + \frac{\partial^2 y}{\partial \eta^2} = 0 \text{ on } \Gamma\pi\Delta \quad (9)$$

where $y = y'$ (of $\partial\Gamma$ on $\partial\Gamma\Delta\pi$)

In the equations, x' and y' are functions given as the boundary condition and defined on the boundary $\partial\Gamma\pi\Delta$ of the complex. The z-direction displacement obeys the rule of changing a virtual elastic film. That is, the displacement $z(\xi,\eta)$ is obtained by solving the following equation (10).

$$\nabla^2 z \equiv \frac{\partial^4 z}{\partial \xi^4} + 2\frac{\partial^4 z}{\partial \xi^2 \partial \eta^2} + \frac{\partial^4 z}{\partial \eta^4} \quad (10)$$

$$= h'(\xi,\eta) \text{ on } \Gamma\pi\Delta$$

In this equation, the boundary condition is also expressed as the equations (3) and (4) ($\underline{z}'$ and the normal line at $\underline{z}'$ have values on the boundary $\partial\Gamma\pi\Delta$ of the complex). That is, $h'(\xi,\eta)$ represents a virtual mechanical force for determining the shape of the curved surface. The gradient may be designated by an arrow through a mouse in the center of a hatched line segment on the boundary $\partial\Gamma\pi\Delta$ of the complex or may be designated by color gradation.

[Process R4]

The relation of the region $\Gamma\pi \rightarrow$ the curved surface $\Gamma$ is determined as follows.

$$(x,y) \xrightarrow[y(\xi,\eta)]{x(\xi,\eta)} (\xi,\eta) \xrightarrow{z(\xi,\eta)} z \quad (11)$$

Because the boundary of $\partial\Gamma\pi\Delta$ the complex sufficiently closely approximate the reference closed curve in the process R2, the following equation (12) is obtained.

$$\begin{cases} x(\xi,\eta) \approx \xi \\ y(\xi,\eta) \approx \eta \end{cases} \quad (12)$$

Accordingly, the components $x(\xi,\eta)$ and $y(\xi,\eta)$ do not have a large influence on the shape of the curved surface $\Gamma$.

The process R3 is classified into processes R31 and R32.

[Process R31]

With respect to the trigonal elements in the complex $\Gamma\pi\Delta$, a component $z(\xi,\eta)$ in the inside thereof is represented by the following equation based on z" for each trigon. Here, --"-- is used as a symbol expressing $\underline{z}$ defined for each trigon.

$$z(\xi,\eta) = z''\Delta(\xi,\eta: \ldots)(\xi,\eta) \in \Delta i,j,k \quad (13)$$

Figure 5:
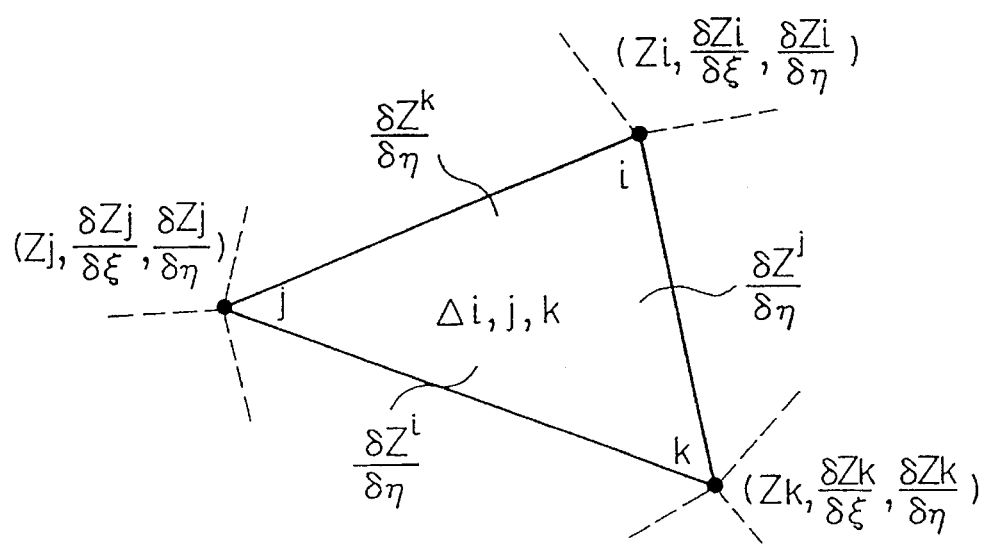
FIG. 5 is a graph for explaining parameters for a relational expression of interpolation with respect to a trigonal element.

The right side of the equation (13) is an interpolation function defined by giving the nodal point $(z, \partial z/\partial \xi, \partial z/\partial \eta)$ for each trigon and the gradient $(\partial z/\partial n)$ at the middle point of each side of the trigon as shown in FIG. 5 and is represented by the following equation using symbols shown in FIG. 5.

$$z''\Delta\left(\xi,\eta: \{z_l\}_\Delta, \left\{\frac{\partial z_l}{\partial \xi}\right\}_\Delta, \left\{\frac{\partial z_l}{\partial \eta}\right\}_\Delta, \left\{\frac{\partial z^m}{\partial n}\right\}_\Delta\right) \quad (14)$$

Here $$\{z_l\}_\Delta = \{z_i, z_j, z_k\}$$

$$\left\{\frac{\partial z_l}{\partial \xi}\right\}_\Delta = \left\{\frac{\partial z_i}{\partial \xi}, \frac{\partial z_j}{\partial \xi}, \frac{\partial z_k}{\partial \xi}\right\}$$

$$\left\{\frac{\partial z_l}{\partial \eta}\right\}_\Delta = \left\{\frac{\partial z_i}{\partial \eta}, \frac{\partial z_j}{\partial \eta}, \frac{\partial z_k}{\partial \eta}\right\}$$

$$\left\{\frac{\partial z^m}{\partial n}\right\}_\Delta = \left\{\frac{\partial z^i}{\partial n}, \frac{\partial z^j}{\partial n}, \frac{\partial z^k}{\partial n}\right\}$$

[Process R32]

All elements contained in { } for determining the function z" in the right side of the equation (13) of trigonal elements $\Delta$ constituting the complex $\Gamma\pi\Delta$ defined by the following relational equation (15).

$$\delta\Pi_{\Sigma\Delta}\left(\{z_l\}_{\Sigma\Delta}, \left\{\frac{\partial z_l}{\partial \xi}\right\}_{\Sigma\Delta}, \left\{\frac{\partial z_l}{\partial \eta}\right\}_{\Sigma\Delta}, \left\{\frac{\partial z^m}{\partial n}\right\}_{\Sigma\Delta} = 0\right) \quad (15)$$

In the equation (15), the function $\Pi$ is represented by the following equation (16).

$$\Pi_{\Sigma\Delta}(\ldots) = \sum_{\text{all }\Delta\text{'s}} \Pi_\Delta\left(\{z_l\}_\Delta, \left\{\frac{\partial z_l}{\partial \xi}\right\}_\Delta, \ldots\right) \quad (16)$$

$$= \sum_{\text{all }\Delta\text{'s}} \iint \left\{ \left(\frac{\partial z''_\Delta}{\partial \xi^2}\right)^2 + 2\left(\frac{\partial^2 z''_\Delta}{\partial \xi \partial \eta}\right)^2 + \left(\frac{\partial^2 z''_\Delta}{\partial \eta^2}\right)^2 - h \right\} d\xi d\eta$$

$$\left\{\frac{\partial z_l}{\partial \xi}\right\}_{\Sigma\Delta}, \left\{\frac{\partial z^m}{\partial n}\right\}_{\Sigma\Delta}) = 0$$

$\{z_l\}_{\Sigma\Delta} = \{z_l: l\epsilon \text{ a set of all nodal points of }\Gamma\pi\Delta\}$ $\left\{\frac{\partial z_l}{\partial \xi}\right\}_{\Sigma\Delta} = \left\{\frac{\partial z_l}{\partial \xi} : l\epsilon \text{ a set of all nodal points of }\Gamma\pi\Delta\right\}$ $\left\{\frac{\partial z_l}{\partial \eta}\right\}_{\Sigma\Delta} = \left\{\frac{\partial z_l}{\partial \eta} : l\epsilon \text{ a set of all nodal points of }\Gamma\pi\Delta\right\}$ $\left\{\frac{\partial z^m}{\partial n}\right\}_{\Sigma\Delta} = \left\{\frac{\partial z^m}{\partial n} : m\epsilon \text{ a set of all sides in }\Gamma\pi\Delta\right\}$ Further
$z_l^* = z_l'$: $\forall l^* \epsilon$ a set of nodal points of $\partial\Gamma\pi\Delta$ $$\frac{\partial z^{m*}}{\partial n} = \frac{\partial z^{m*'}}{\partial n} : \forall m^* \epsilon \text{ a set of sides of }\partial\Gamma\pi\Delta \quad (17)$$

In the equation (17), "*" is a symbol expressing that the point is on the boundary.

As described above, the sectional curved surface A as shown in FIG. 7 can be obtained in the same manner as in the previous embodiment by: expressing the reference closed curve $\partial\Gamma\pi$ by the equation (10) of a virtual elastic film; giving a mechanical force thereto; dividing the region $\Gamma\pi$ into an Euclidean simplex complex $\Gamma\pi\Delta$; and giving a gradient to the boundary $\partial\Gamma\pi\Delta$ of the complex.

The processes R31 and R32 are processes for generating a curved surface by reference to trigonal elements of the complex $\Gamma\pi\Delta$, sides thereof and nodal points thereof. The processes R31 and R32 are obtained by classifying the process R3. For example, the interpolation function described in the process R31 is composed by an HCT adaptive triangular element method described in the reading by Kyuichiro Washitsu et al., "Finite Element Method Handbook Basic Compilation", Baifukan, Pages 256–263. In the process R32, simultaneous linear equations concerned with desired unknown variables are consequently obtained, so that the solution thereof is univocally obtained. Various techniques for solving the simultaneous equations are solving the simultaneous equations are known. For example, the simultaneous equations can be solved by a Gauss' erasing technique. In this embodiment, the process of dividing the region $\Gamma\pi$ into trigons is required, but is easily carried out because the process is applied on the reference plane $\pi$. Further, a known automatic dividing method can be used. Because the problem is dealt with after it is classified into small parts, a curved surface $\pi$ can be easily generated from a three-dimensional closed curve given by the designer.

Figure 6:
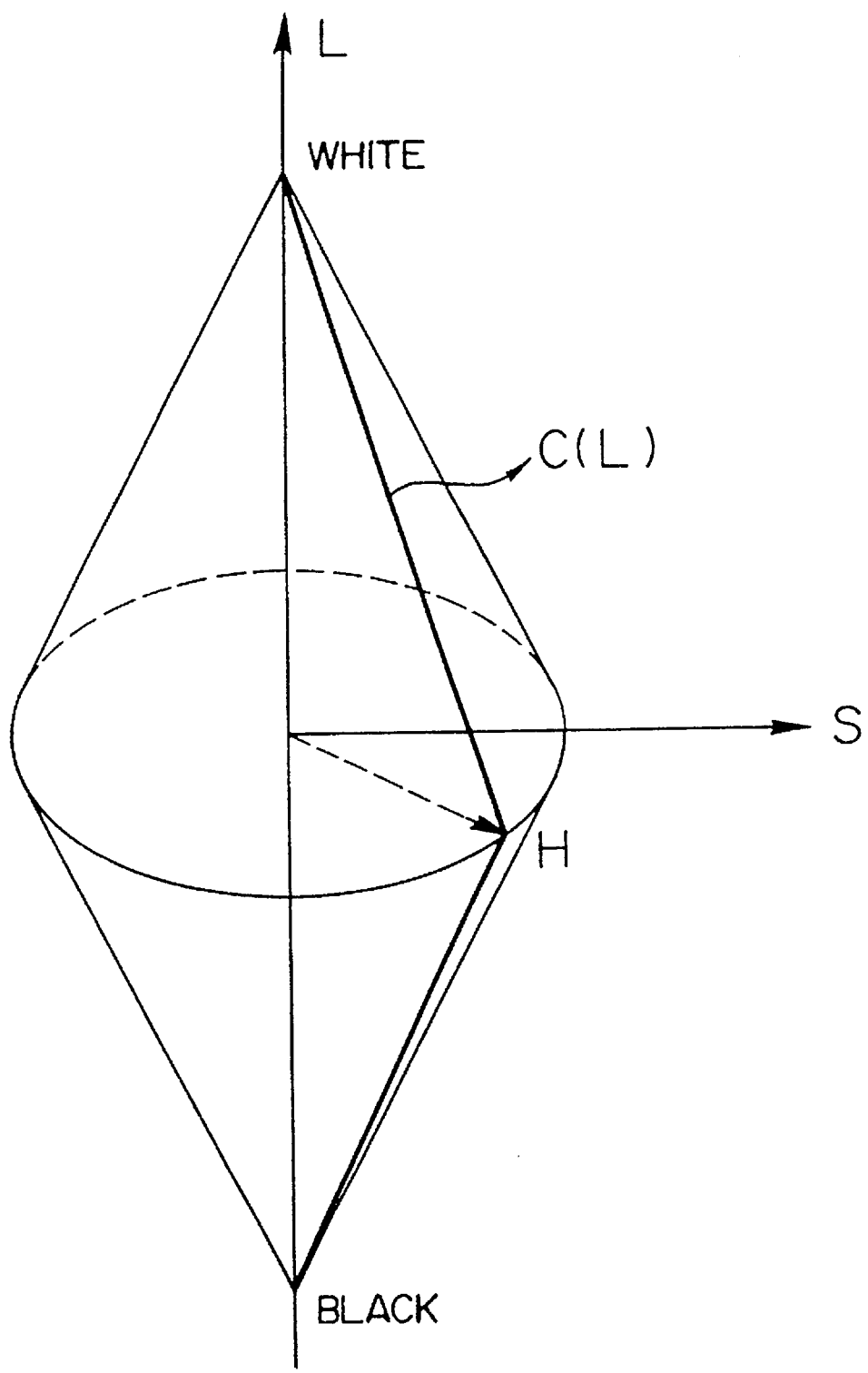
FIG. 6 is a graph for explaining the setting of luminance data on the basis of a color solid in an HLS system.

Although the embodiments have shown the case where control parameters for generating a curved surface are given correspondingly to the curved surface $\Gamma$ so that the rule of trial and error is repeated for setting the control parameters to generate a desired curved surface, the invention can be applied to the case where a technique of setting physical continuous quantities at respective points on the curved surface $\Gamma\pi$ may be used as a method of giving control parameters. As an example thereof, the region $\Gamma\pi$ may be classified by color groups C(L) having the continuous physical quantity of L (luminance) on the condition that both H (hue) and S (saturation) are fixed in an HLS color solid view as shown in FIG. 6, so that control parameters can be expressed by the values of L (luminance data) corresponding to respective picture elements on the region $\Gamma\pi$. The curved surface can be changed not only easily through setting such control parameters on the whole of the region but interactively through exhibition on the display.

According to the present invention, not only the shape of a curved surface desired by the designer can be easily and speedily generated and exhibited on the display but the operating property of the curved surface generator can be improved so greatly that unskilled operators can master this generator.

What is claimed is:

1. A curved surface generating method of generating an arbitrarily-shaped curve surface and for displaying said curved surface on a display, said method comprising the steps of:

providing a boundary of an arbitrarily-shaped curved surface to be generated in three-dimensional space as a closed loop;

generating a curved surface bounded by said closed loop such that said curved surface satisfies an equation of a predetermined physical property; and changing a shape of said curved surface by changing boundary conditions and values of parameters of said equation.

2. A curved surface generating method according to claim 1, wherein said equation corresponds to an elastic film, a boundary of said elastic film is defined as a closed curve by a restricting condition and a quantity of displacement of said elastic film is defined by a loading condition.

3. A curved surface generating method according to claim 2, in which said restricting condition is given by defining a tangential plane of said elastic film represented by said closed curve as a vector function.

4. A curved surface generating method according to claim 2, in which said loading condition is given as a function representing a virtual mechanical force loaded on said elastic film.

5. A curved surface generating method according to claim 1, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

6. A curved surface generating method of generating an arbitrarily-shaped curved surface and for displaying said curved surface on a display, said method comprising the steps of:

displaying a boundary of an arbitrarily-shaped curved surface to be generated in a three-dimensional space as a closed loop;

generating a closed curve boundary of said curved surface of said arbitrarily-shaped bounded by said closed loop on a plane;

dividing a region of said closed curve into small regions not overlapping one another;

converting each of said small regions into equations of a predetermined physical property;

setting a boundary condition of said curved surface in said equations; and generating said curved surface on said small regions such that said equations of predetermined physical property are satisfied and that said closed curves including said small regions are disposed on the boundary of said curved surface of said arbitrarily-shaped object.

7. A curved surface generating method according to claim 6, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

8. A curved surface generating method of generating an arbitrarily-shaped curved surface and of displaying said curved surface on a display, said method comprising the steps of:

displaying a boundary of an arbitrarily-shaped curved surface to be generated in a three-dimensional space as a closed loop;

generating a reference closed curve by projecting said closed loop onto a plane in one-to-one correspondence;

dividing a region of said reference closed curve into polygons not overlapping one another;

converting each of said polygons into equations of a predetermined physical property;

setting said closed loop in said equations; and displacing said curved surface on each of said polygons and displacing said curved surface on said reference closed curve by solving said equations, to thereby generate a projection surface, such that said equations are satisfied, by projecting said reference closed curve on the boundary of said arbitrarily-shaped curved surface, said projection surface being the curved surface generated on said reference closed curve.

9. A curved surface generating method according to claim 8, in which said equations correspond to an elastic film, a boundary of said elastic film being defined as a closed curve by a restricting condition.

10. A curved surface generating method according to claim 9, in which both said boundary condition and said restricting condition are applied, as continuous quantities, to predetermined points along said reference closed curve.

11. A curved surface generating method according to claim 8, in which said curved surface is represented as a wire frame and said equation corresponds to and elastic film, which is pulled over said wire frame, based on a condition for defining the boundary of said elastic film as a closed curve as a restricting condition and for defining the quantity of the change of said elastic film as a loading condition.

12. A curved surface generating apparatus of generating an arbitrarily-shaped curved surface and for displaying said curved surface on a display, said curved surface to be generated in a three-dimensional space as a closed loop, comprising:

boundary generating means for generating a closed curve in a three-dimensional space bounded by said closed loop;

display means for displaying said closed curve on a display;

arithmetic operation means for converting said closed curve into an equation of a predetermined physical property; and curved surface generating means for generating said curved surface such that said equation is satisfied and that the curved surface is generated on the boundary of said closed curve.

13. A curved surface generating apparatus according to claim 12, wherein said equation is corresponds to an elastic film, a boundary of said elastic film is defined as a closed curve be a resticting condition, and a quantity of displacement of said elastic film is defined by a loading condition.

14. A curved surface generating apparatus according to claim 13, in which said restricting condition is given by defining a tangential plane of said elastic film by said closed curve as a vector function.

15. A curved surface generating apparatus according to claim 13, in which said loading condition is given as a function representing a virtual mechanical force loaded on said elastic film.

16. A curved surface generating apparatus according to claim 13, further comprising a data file for storing both said boundary condition and said restricting condition which are set as continuous quantities in predetermined points along said reference closed curve.

17. A curved surface generating apparatus according to claim 12, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

18. A curved surface generating apparatus of generating an arbitrarily-shaped curved surface and for displaying said curved surface on a display, said curved surface to be generated in a three-dimensional space as a closed loop, comprising:

boundary generating means for generating a boundary of an arbitrarily-shaped curved surface to be generated in a three-dimensional space as a closed loop;

display means for displaying said boundary on a display;

arithmetic operation means for generating a closed curve bounded by said closed loop on a plane and converting said closed curve into an equation of a predetermined physical property;

shape setting means for setting said closed loop in said equation to solve said equation, and obtaining the shape of said curved surface; and curved surface generating means for generating said curved surface on said closed curve by displacing said closed curve so that said equation is satisfied and that said closed curve is disposed on said boundary of said curved surface of said arbitrarily-shaped object.

19. A curved surface generating apparatus according to claim 18, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

20. A curved surface generating apparatus for generating an arbitrarily-shaped curved surface and for displaying said curved surface on a display, said curved surface to be generated in a three-dimensional space as a closed loop, comprising:

boundary generating means for generating a boundary of an arbitrarily-shaped curved surface to be generated in a three-dimensional space as a closed loop;

display means for displaying said boundary on a display;

projection generating means for generating a reference closed curve by projecting said closed loop onto a plane in one-to-one correspondence;

arithmetic operation means for converting said reference closed curve into an equation of a predetermined physical property;

shape setting means for setting parameters for determining a boundary condition and shape of said curved surface in said equation to solve said equation, and obtaining the shape of said curved surface; and curved surface generating means for generating a projection surface, such that said equation is satisfied, by projecting said reference closed curve on said the boundary of said curved surface of said object, said projection surface being the curved surface generated on said reference closed curve.

21. A curved surface generating apparatus according to claim 20, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

22. A curved surface generating apparatus for generating an arbitrarily-shaped curved surface and for displaying said curved surface on a display, comprising:

boundary generating means for generating a boundary of an arbitrarily-shaped curved surface to be generated in a three-dimensional space as a closed loop;

display means for displaying said boundary on a display;

dividing means for generating a closed curve bounded by said closed loop arbitrarily-shaped object on a plane and dividing said closed curve into small regions not overlapping one another;

arithmetic operation means for transforming said small regions into an equation of a predetermined physical property;

shape setting means for setting said closed loop in said equation to solve said equation, and obtaining the shape of said curved surface; and curved surface generating means for generating a curved surface on said small regions groups such that said equation is satisfied and that said closed curves including said small regions are disposed on said boundary of said curved surface of said arbitrarily-shaped object.

23. A curved surface generating apparatus according to claim 22, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

24. A curved surface generating apparatus for generating an arbitrarily-shaped curved surface and for displaying said curved surface on a display, said curved surface to be generated in a three-dimensional space as a closed loop, comprising:

boundary generating means for generating an arbitrarily-shaped boundary of a curved surface to be generated in a three-dimensional space as a closed loop;

display means for displaying said boundary on a display;

projection generating means for generating a reference closed curve by projecting said closed loop onto a plane in one-to-one correspondence;

dividing means for dividing a region of said reference closed curve into polygons not overlapping one another;

arithmetic operation means for transforming said polygons into equations of a predetermined physical property;

shape setting means for setting said closed loop in said equation to solve said equation, and obtaining the shape of said curved surface; and curved surface generating means for displacing said reference closed curve including said polygons by projecting said reference closed curve onto the boundary of said curved surface of said arbitrarily-shaped object, and generating the curved surface on said reference closed curve such that said equations are satisfied.

25. A curved surface generating apparatus according to claim 24, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

26. A curved surface generating method of generating an arbitrarily-shaped curved surface and for displaying said curved surface on a display, said method comprising the steps of:

providing a boundary of an arbitrarily-shaped curved surface to be generated in a three-dimensional space as a first closed loop;

providing a second closed loop on a plane of three-dimensional space;

generating a first curved surface bounded by said second closed loop such that said first curved surface satisfies an equation of a predetermined physical property; and changing a shape of said first said curved surface by changing boundary conditions and values of parameters of said equation such that said second closed loop coincides with said first closed loop.

27. A curved surface generating method according to claim 26, in which said curved surface is represented as a wire frame and said equation corresponds to an elastic film, which is pulled over said wire frame, based on a condition for defining the boundary of said elastic film as a closed curve as a restricting condition and for defining the quantity of the change of said elastic film as a loading condition.

28. A curved surface generating method of generating an arbitrarily-shaped curved surface and for displaying said curved surface on a display, said method comprising the steps of:

providing a boundary of an arbitrarily-shaped curved surface to be generated in a three-dimensional space as a first closed loop;

generating a second closed loop by projecting said first closed loop onto a plane of said three-dimensional space such that said second closed loop has one-to-one correspondence with said first closed loop;

generating a first curved surface bounded by said second closed loop such that said first curved surface satisfies an equation of a predetermined physical property;

changing a shape of said first curved surface by changing boundary conditions and values of parameters of said equation; and generating a second curved surface in three-dimensional space by inverse projecting said first curved surface.

29. A curved surface generating method according to claim 28, in which said curved surface is represented as a wire frame said said equation corresponds to an elastic film, which is pulled over said wire frame, based on a condition for defining the boundary of said elastic film as a closed curve as a restricting condition and for defining the quantity of the change of said elastic film as a loading condition.

30. A curved surface generating method of generating an arbitrarily-shaped curved surface, said method comprising the steps of:

providing a boundary of an arbitrarily-shaped curved surface to be generated in three-dimensional space bounded by a wire frame;

dividing a region of said wire frame into small regions not overlapping one another;

converting each of said small regions into equations satisfying predetermined physical properties of an elastic film;

setting a boundary condition of said curved surface in said equations corresponding to said elastic film; and generating said curved surface on said small regions such that said equations satisfying predetermined physical properties of said elastic film are satisfied and that said closed curves including said small regions are disposed on the boundary of said wire frame of the closed surface of said arbitrarily-shaped object.

* * * * *